United States Patent Office 3,483,354
Patented Dec. 9, 1969

3,483,354
METHOD FOR DEPOSITING METAL WITH A TIG ARC
August F. Manz, Union, John F. Saenger, Jr., Springfield, Norman D. Freeman, Scotch Plains, and Frank T. Stanchus, West Orange, N.J., assignors to Union Carbide Corporation, a corporation of New York
Filed Mar. 1, 1965, Ser. No. 436,178
Int. Cl. B23k 9/00
U.S. Cl. 219—137                           2 Claims

ABSTRACT OF THE DISCLOSURE

A process for arcless deposition of filler metal in combination with a TIG welding process wherein the filler metal is heated by $I^2R$ heating. The power supply for the filler electrode has a relatively flat volt-ampere characteristic shape such that changes in wire feed rate demands can be accommodated by a small current change while avoiding an accompanying, relatively large power change. The filler electrode is positioned to enter the weld puddle at an angle from about 0° to about 60° from the axis of the TIG electrode, thus obviating the problem of the wire skipping across the weld puddle and shorting the tungsten electrode.

---

This invention relates to a process for depositing metal with a tungsten inert gas (TIG) arc process and, more particularly, to such a process wherein the metal to be deposited carries current provided by a source separate from the source energizing the TIG arc.

The TIG arc welding process is known to be a high-quality process even in many materials not easily welded by other methods. However, a major drawback when filler wire is to be used with the process is that welding speeds are not as high as desired. This is true, at least in part, because the TIG arc must melt the filler wire as well as the base plate. Heretofore, when using filler wire it was necessary to add the filler wire into the leading edge of the puddle with respect to the direction of travel. This, of course, is the area of the puddle in which the arc is impinging on the workpiece and, since the wire is entering the puddle cold, it tends to chill the puddle. Thus, with the prior art process of adding filler wire, minor fluctuations in the wire feed adversely affect weld penetration.

Slow welding speeds, inherent in nonconsumable electrode welding, result in another disadvantage when welding heat-treatable alloy—especially those of aluminum and high strength steel such as are commonly used in aircraft and missile applications. Low welding speed can result in excessive heat input into the base material, precipitating some of the alloying elements or disturbing physical properties developed by prior heat treatment. This may reduce the tensile strength and/or toughness of the alloy in the weld or heat-affected zone. The faster the weld can be made, the less the base material is affected by the welding operation. Therefore, high welding speeds are usually very desirable when welding heat-treatable materials.

Accordingly, it is a main object of the invention to provide a process which combines the quality of the TIG arc process with high wire deposition rates.

Another object is to provide a welding process which combines the quality of the TIG welding process with high welding speeds.

Another object is to provide such a TIG welding process wherein filler metal is used.

A further object is to provide a TIG welding process wherein electrically heated filler metal is deposited in the weld puddle.

A further object is to provide a process for welding thick plate with a narrow groove preparation.

These and other objects will either be printed out or become apparent from reference to the following description and drawings wherein.

Figure 1:
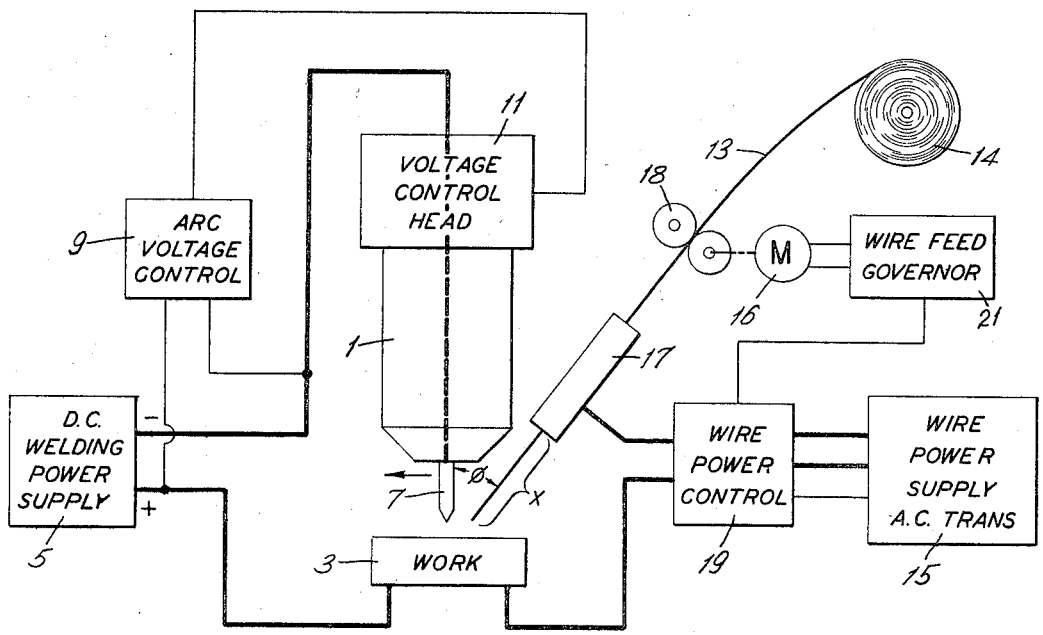
FIGURE 1 is a schematic diagram of typical mechanized apparatus for carrying out the invention.

This invention is predicated on the discovery that the objects may be accomplished by a method of depositing metal with an electric arc established between a nonconsumable electrode and a workpiece connected in electrical circuit relationship with a first power supply wherein such arc produces a molten puddle on said workpiece and said arc and molten puddle are shielded by a gas which comprises continuously feeding a consumable wire electrode connected in circuit relationship with said workpiece and a second power supply from a source of such wire into said molten puddle; maintaining the angular relationship between the axis of said nonconsumable electrode and the axis of said consumable electrode between about 0 degrees to about 60 degrees; introducing electric energy into said consumable electrode wire at a point on said wire to continuously melt the end of said consumable electrode wire; and controlling and correlating the consumable electrode wire feed speed, the value of the electric energy and the point where the energy is introduced into such wire to cause such continuous melting to occur without the formation of a spark or arc subsequent to starting of such energy introduction.

The method outlined in general terms herein above combines the reliability, quality and simplictiy of the TIG process with the high wire deposition rates and welding speed necessary to achieve and maintain good economics and even improved weld quality on certain alloys.

Our invention permits filler metal to be introduced into the weld 3 to 10 times faster than conventional cold wire deposition with TIG.

The high deposition technique generally is based on the discovery that a continuously fed consumable electrode wire can be melted and deposited on a workpiece without an arc or external source of heat. This concept is described in U.S. Patent 3,122,629, issued Feb. 25, 1964. This technique is most useful as a welding tool when it is complemented because it is not possible to inject sufficient additional energy into the filler metal to melt the adjacent work surface and fuse the deposit to it. However, where a molten pool already exists, as under a TIG arc, large amounts of additional melted material can be added to this pool without solidifying.

As a basic process, TIG offers the largest freedom of heat input-to-deposition ration. This flexibility is now greatly enhanced by the high deposition technique where filler metal is melted by its own energy source so that the deposition rate can be controlled almost independently of the arc. The limitation on deposition is only the amount of metal that can be usefully deposited into any arc puddle. This characteristic allows the arc and wire feed to be adjusted independently within wide limits far exceeding existing processes.

To achieve the full benefits of this high deposition technique the molten filler metal is preferably fed into the rear of the weld puddle behind the arc. This allows the TIG arc to concentrate on the base plate to prepare for a maximum amount of filler metal by wetting a larger amount of joint surface. This is accomplished because the arc energy is not cushioned and absorbed by the filler metal as it would be with conventional cold wire fed at the leading edge of the puddle.

The freedom to utilize the energy of the TIG arc solely for base metal melting means a corresponding freedom in choosing joint designs.

In order to achieve the above-described advantages with the process of this invention, certain critical parameters should be closely controlled. The TIG process basically involves the use of a tungsten electrode for straight polarity welding, that is when the work is connected to the positive side of the power supply, the electrode is connected to the negative side of the power supply. The electrode usually extends beyond a gas-directing nozzle and thus is exposed to contaminates which are able to penetrate the protective envelope of gas provided by the gas-directing nozzle. It was found that when filler wire carrying its own electrical current to melt such wire was continuously fed at high speeds into the TIG weld puddle in a manner similar to adding cold filler wire, the wire would skip across the puddle and short to the nonconsumable tungsten electrode. This would mean that the weld would have to be stopped and checked for tungsten inclusions which, of course, are undesirable. Accordingly, to avoid this problem and insure good electrical contact between the nonconsumable electrode wire and the workpiece, the wire is positioned to strike the crest of the weld puddle at a steep angle as it raises behind the arc. This position is defined herein in terms of the angular relationship between the axis of the consumable electrode wire and the nonconsumable electrode. The angle therebetween should be maintained from about 0 degrees to about 60 degrees. The preferred angle is 30 degrees.

Another similar problem arose when sparking of the consumable electrode filler wire occurred. In this case it was found that when the wire was fed too slowly for the power being supplied to the wire, the wire would burn off before it reached the weld puddle causing a spark and spatter which would contaminate the exposed tungsten electrode. Thus, in the process of this invention, the consumable electrode filler wire should begin to pinch-off just as the wire makes contact with the weld puddle. This situation is achieved according to the invention by controlling the wire feed speed, power supplied to the wire, and the point where the power is introduced into the wire and correlating these parameters so that sparking as well as arcing is avoided and the wire begins to pinch-off just as it reaches the puddle.

Having described the invention in general terms, a more specific description will now be made with reference to the drawings wherein a TIG torch is denoted generally at 1. This torch is connected in circuit with the workpiece 3 and a welding power source 5, preferably a D.C. source, connected to the torch 1 such that the electrode 7 is negative and the work 3 is positive. The electrode 7 is usually tungsten or modifications thereof such as 1 percent or 2 percent thoriated tungsten or a tungsten electrode with a stripe of thoriated tungsten. While the preferred power connection is with the electrode 7 negative such electrode could be positive. Further A.C. power could be used. An arc voltage control 9 can be used to maintain the voltage across the arc substantially constant by operating the voltage control head 11 to move the torch in order to maintain the proper electrode-to-work distance. The filler wire 13, hereinafter referred to as "hot wire," supplied from a source 14 is connected in circuit with another power source 15 and the work 3. The power source 15 is preferably an alternating current transformer. The magnetic field such source produces around the hot wire causes only a small net effect on the TIG arc. Further, the A.C. transformer should have a low open circuit voltage (about 3 to about 25 volts) and an essentially flat volt/ampere slope.

The hot wire 13 is fed toward the work 3 by drive motor 16 and rolls 18. Energy from the source 15 is introduced into the wire 13 by contact tube 17 and such energy is controlled by wire power controller 19. Wire feed speed is controlled by governor 21.

In operation, the wire 13 is fed from supply 14 by the rolls 18 and drive 16 through the contact tube 17 connected to source 15 and work 3. The hot wire is melted by $I^2R$ heating effect of an electric current flowing through a conductor which is in this instance the wire. Between the contact tube 17 and the workpiece 3 is a melting extension X through which the wire passes. As an increment of wire exits from the contact tube 17 it is at room temperature, but it is carrying the current supplied by power supply 15. As the wire moves through the melting extension X its temperature is raised by $I^2R$ heating. The current is adjusted so that the wire reaches melting conditions as it enters the weld puddle which has been created in the work 3 by the TIG arc between electrode 7 and work 3.

The wire melting system must be adjusted to supply the energy required to raise the wire from room temperature to its molten state. As an example, carbon and low alloy mild steel wires require about 0.16 kilowatt hours per pound. This results in operating conditions of 75–300 amperes at 5–18 volts with 0.030 to 0.045 in. wires for melting extensions of 1¼ to 2 in.

The wire feed speed, the point of contact, and the electrical energy introduced into the wire must be controlled. This control can be achieved either manually by operator surveillance or by control systems. The object in either case is to balance the wire feed speed and power supplied so that the wire will not spark as described previously. When continuous sparking occurs small bits of wire are expelled, some of which strike and contaminate the tungsten electrode. This can result in subsequent weld contamination if welding is not stopped and the electrode reground or replaced.

As noted previously, sparking results where the power supplied is greater than that necessary to melt the wire as it reaches the weld puddle. Three adjustments can be made to prevent such sparking. The power supply output can be reduced until sparking stops or the wire feed speed can be increased with a similar result. The former would be best if the amount of metal being deposited is optimum. If more metal could be utilized the latter is practiced. The other possible adjustment is to lengthen the melting extension. Because of the characteristics of the power supply, this will reduce the power input to the system tending to stop sparking.

Figure 2:
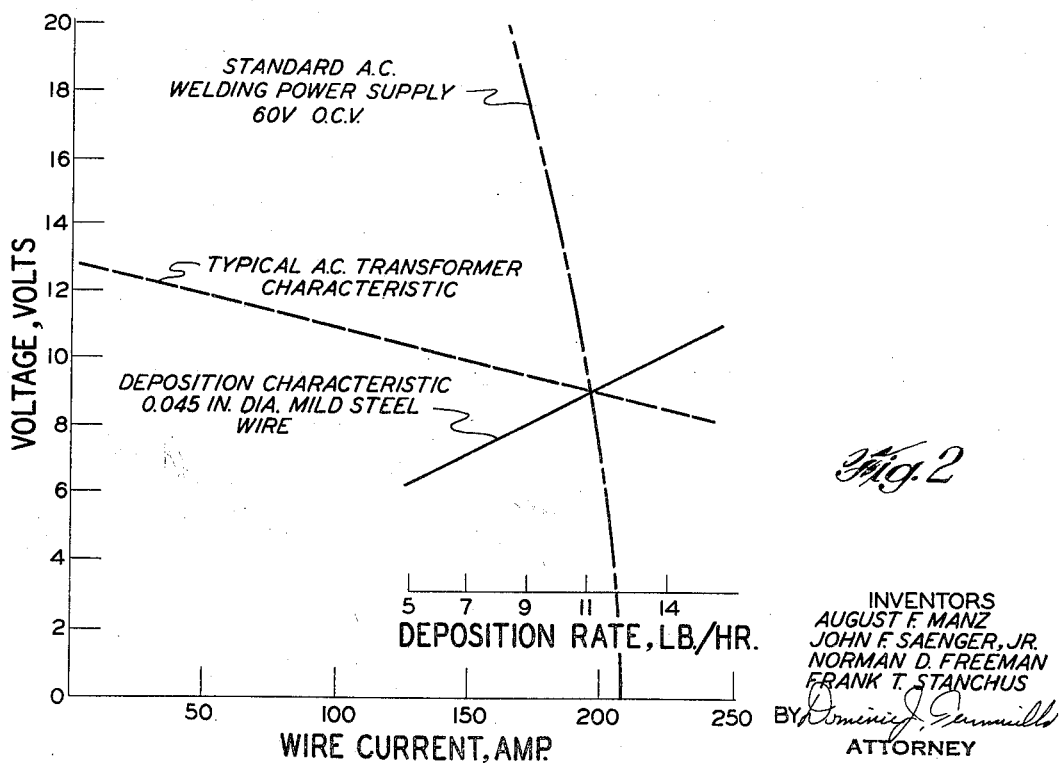
FIGURE 2 is a graph comparing power supply characteristics to hot wire melt rate.

As mentioned above, an A.C. transformer with an essentially flat slope is preferred. Referring to FIG. 2, an operating point of 200 amperes and 9 volts is shown for a steel wire deposition rate of about 11.4 lbs./hr. If the wire feed rate were to decrease to 10.5 lbs./hr., the power requirement for smooth melting would change to about 190 amperes at 8.5 volts.

However, with a conventional welding power supply a small reduction in current is accompanied by a relatively large increase in voltage. This net increase could cause excess power to be supplied to the wire and cause it to melt off before it reached the weld puddle. The circuit would break and the full open circuit voltage of the power supply would appear at the end of the wire. Since the wire would melt off with a spark, an undesirable arc would be established. If the feed rate is reduced when using a power supply with a relatively flat characteristic and low open circuit voltage, the wire may also melt and pinch off above the puddle with a spark. However, the open circuit voltage of the A.C. transformer is well below an arc sustaining voltage so an arc will not start and the wire will continue to alternately feed into the puddle and burn back until a simple adjustment of the power supply or wire feed can be made.

If the wire speed is increased from the operating point shown in FIG. 2, the available power from the drooping power supply rapidly approaches zero at slightly over 200 amperes. This causes the wire to stub violently into the puddle. With a flat characteristic transformer, the available power decreases only slightly so although the wire may stub lightly into the puddle, considerable energy is still being supplied to it and the process is not disrupted.

Referring again to FIG. 1, a shielding gas is supplied through torch 1 to protect the electrode 7 and the weld puddle created on the work 3. The shielding gas may be an inert gas compatible with the electrode and the material being welded. Gases such as argon and helium or mixtures thereof are preferred. For example, 75 percent helium-25 percent argon is especially preferred for narrow-gap welding of steel. Hot wire is fed behind the arc after the puddle has been established. The arc heat primarily melts the work so that the largest possible amount of filler metal from the hot wire can be accommodated. To insure good contact the hot wire is positioned to strike the crest of the weld puddle at an angle θ as the crest rises behind the arc. The angle θ should be between 0 degrees and 60 degrees. Hence, variations in electrode-to-work distances cause little change in the point at which the filler metal is added. When the wire is introduced to the puddle with angles greater than 60 degrees from the arc axis in a manner similar to cold wire addition, it frequently "skips" across the puddle and shorts to the electrode. Investigation of several arc and wire configurations indicates that the wire should be positioned in the range of 0 degrees to 60 degrees from the arc axis to produce the best results.

Figure 3:
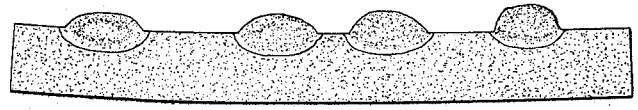
FIGURE 3 illustrates the effect of changing deposition rate on weld bead contour.
Figure 4:
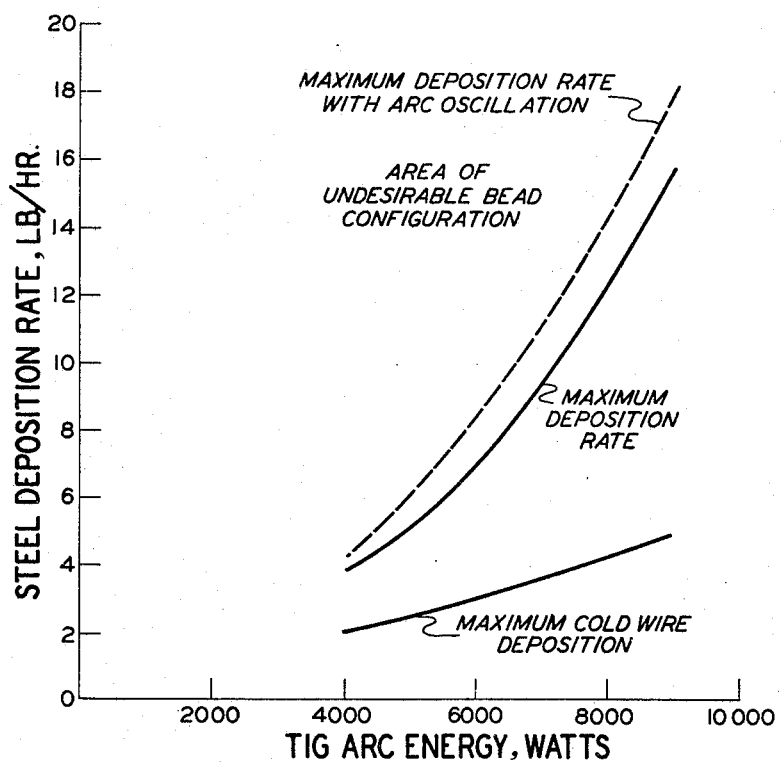
FIGURE 4 is a graph showing deposition rates in steel for the process of the invention.

Since the wire is melted by its own power source, the deposition rate can be controlled almost independently of the arc. Deposition rates are limited solely by the amount of metal that can be usefully deposited behind any arc consistent with the maintenance of good weld bead geometry. This characteristic permits the arc and wire feed to be adjusted independently within extremely wide limits to meet varying conditions of materials, joint design, and other factors. FIGURE 3 shows the effect of change in deposition rate on weld bead cross-section. Welding conditions were 400 amperes D.C.S.P., 21 volts, 15 i.p.m. in helium shielding. The operating relationship between TIG arc energy and deposition rates for both cold and hot filler wires is shown in FIG. 4. These curves are based on bead-on-plate data. The maximum deposition rate shown for a given arc energy is that which results in a weld bead width to height ratio of 2.5:1, a configuration generally satisfactory for multipass welds in standard V groove joint preparations. Any specific application may vary from the values shown.

Relatively small wires are presently considered to be most practical for this process, with 0.045 in. diameter giving the best performance to date. Wires 0.030 in. in diameter must be fed at speeds greater than 1000 i.p.m. for deposition rates of 12 to 14 lbs./hr. These high wire speeds are difficult to control accurately with standard equipment.

Utilizing the procedures described above, high deposition TIG welds have been made in 18 percent nickel maraging, HY-80 and D6AC steels with excellent results at speeds equal to, or greater than, MIG welding. Typical properties of these welds are shown in Table I.

The characteristic independent control of arc and deposition rate are extremely valuable in applying the process to welding in a narrow grove preparation, i.e., ⅜ in. wide and one or more inches deep. Successful narrow groove welds have been made in mild steel, HY-80, and HY-150 in the downhand position. HY-80 generally has essentially the following analysis: 0.18 percent maximum carbon; 0.10 percent to 0.40 percent manganese; 1.00 percent to 1.80 percent chromium; 2.00 percent to 3.25 percent nickel; 0.20 percent to 0.60 percent molybdenum; 0.15 percent to 0.35 percent silicon; 0.025 percent maximum phosphorous; 0.025 percent maximum sulfur, and the balance iron. This steel has a yield strength in the order of 80,000 p.s.i. HY-150 generally has the following chemical analysis: 0.12 percent carbon; 1.00 percent manganese; 0.25 percent silicon; 0.007 percent phosphorous; 0.007 percent sulfur; 5.00 percent nickel; 0.50 percent chromium; 0.50 percent molybdenum; 0.07 percent vanadium; and the balance iron. HY-150 has a yield strength in the order of 150,000 p.s.i. The arc can be adjusted to adequately fuse the base plate side walls while the filler wire is separately adjusted to provide the desired bead shape.

Table II is a comparison of the process of the invention with narrow-gap welds and conventional metal inert gas (MIG) in single V groove welds. It is to be noted that ductility and impact properties as well as tensile strength levels are higher with the invention process than with the same heat of wire and conventional MIG.

Two inch thick mild steel plates were square groove welded in a butt joint with a root opening of about ⅜ in. The arc condition was 430 amperes at 21 volts with helium gas shield around a tungsten electrode. The electrode extended into the gap between the plates adjacent the root thereof. Argon shielding gas was provided to protect the electrode and weld puddle at the base of the joint. Travel speed was 10-14 i.p.m. The filler hot wire was deposited at 10 lbs./hr. on the first pass increasing to 12.5 lbs./hr. on the final pass.

For purposes of this disclosure, a narrow groove or gap is defined as a butt joint in plate of thickness greater than ½ in. in which the sides of the joint are essentially parallel and spaced less than ½ in. apart, or the sides of the joint may be beveled but the included angle between them is less than 15 degrees, the spacing of the joint at the closest point is still less than ½ in.

TABLE I.—TYPICAL PROPERTIES OF TIG WELDS WITH HOT WIRE FILLER METAL AND WELDS IN SIMILAR MATERIALS WITH STANDARD TECHNIQUES

| Material | Process | Filler wire | Average deposition rate, lbs./hr. | Ultimate tensile strength K s.i. | Yield strength K s.i. | Elongation, percent | Reduction of area percent | Charpy-V notch energy ft./lbs. |
|---|---|---|---|---|---|---|---|---|
| HY-80 | MIG | Ml-88 [1] | 11-12 | 109 | 102 | 20 | 65 | 100 (−60° F.) |
| HY-80 | TIG "Hot Wire" | Ml-88 [1] | 15 | 105 | 97.5 | 23 | 74 | 100 (−60° F.) |
| 18% Ni Maraging | MIG | 18% Ni | 12.5 | 217 | 197 | 9.2 | 38.5 | 16 (0° F.) |
| Do | TIG "Hot Wire" | 18% Ni | 12 | 220 | 210 | 10 | 44 | 19 (0° F.) |

[1] Ml-88 is essentially 0.06 carbon, 1.60 manganese, 1.70 nickel, .30 molybdenum, 0.40 silicon.

TABLE II.—TIG HOT WIRE AND CONVENTIONAL MIG WELDING 5Ni-Cr-Mo-V STEEL (HY-150)
[Mechanical properties of welds made in 1 in. thick plate]

| Process | Average deposition rate, lbs./hr. | Yield strength, 0.2% offset, K s.i. | Tensile strength, K s.i. | Elongation, percent | Reduction of area, percent | Charpy-V notch energy absorption, ft./lbs. | | | | | |
|---|---|---|---|---|---|---|---|---|---|---|---|
| | | | | | | R.T. | 0° F. | −60° F. | −80° F. | −100° F. | −150° F. |
| TIG: | | | | | | | | | | | |
| Top of joint | 11 | 127.4 | 157.0 | 17.5 | 64.1 | 88 | 87 | 71 | | 61 | 42 |
| | | 132.5 | 155.6 | 18.4 | 62.8 | | | | | | |
| Bottom of joint | 11 | 142.0 | 154.3 | 18.8 | 66.5 | 84 | 70 | 61 | | 44 | 26 |
| | | 142.0 | 152.8 | 18.6 | 67.8 | | 93 | 63 | | 50 | |
| MIG—AWM [1] | 11 | 138.3 | 148.9 | 15.6 | 60.8 | 58 | 51 | 46 | | 36 | |
| Plate properties: | | | | | | | | | | | |
| Longitudinal | | 144.0 | 155.0 | 19.0 | | 86 | 90 | | 82 | | |
| Transverse | | 142.0 | 153.0 | 18.0 | | 74 | 74 | | 60 | | |

[1] All weld metal.

NOTE.—TIG, MIG, and plate tensile data obtained with round all weld metal tensile specimens.

What is claimed is:

1. A method of depositing metal with an electric arc established between a nonconsumable electrode and a workpiece connected in electrical circuit relationship with a first power supply wherein such arc produces a molten puddle on said workpiece and said arc and puddle are shielded by a gas which comprises: continuously feeding a consumable wire electrode connected in circuit relationship with said workpiece and a second power supply from a source of such wire into said molten puddle; maintaining the angular relationship between the axis of said nonconsumable electrode and said consumable electrode between about 0 degrees to about 60 degrees; introducing electric energy provided by an A.C. transformer having an essentially flat slope into said consumable electrode wire at a point on said wire to continuously melt the end of said consumable electrode wire; and controlling and correlating the consumable electrode wire feed speed, the value of the electric energy and the point where the energy is introduced into such wire to cause such continuous melting to occur without the formation of a spark subsequent to starting of such energy introduction.

2. A method for making a narrow gap weld which comprises establishing an electric arc between a nonconsumable electrode positioned in such narrow gap adjacent the root thereof and the workpiece connected in electrical circuit relationship with a first power supply wherein such arc produces a weld puddle in said narrow gap; shielding said arc and weld puddle with a gas compatible with said electrode; continuously feeding a consumable wire electrode connected in circuit relationship with said workpiece and a second power supply from a source of such wire into said weld puddle in said narrow gap; maintaining the angular relationships between the longitudinal axis of said nonconsumable electrode and the longitudinal axis of said consumable electrode between about 0 degrees and about 60 degrees; introducing electric energy provided from an A.C. transformer with an essentially flat volt/ampere characteristic slope into said consumable electrode wire at a point on said wire to continuously melt the end of said consumable electrode wire; and controlling and correlating the consumable electrode wire feed speed, the value of the electric energy and the point where the energy is introduced into such wire to cause such continuous melting to occur without the formation of a spark subsequent to starting of such energy introduction and making additional weld passes until said groove is filled.

References Cited

UNITED STATES PATENTS

| | | |
|---|---|---|
| 2,868,954 | 1/1959 | Skinner et al. _____ 219—130 |
| 3,122,629 | 2/1964 | Manz. |
| 3,163,743 | 12/1964 | Wroth et al. _____ 219—137 |

OTHER REFERENCES

Correy, T. B., "Weld Alloying Improvement with Square Type Current Waves on Alternating-Current Tungsten-Arc Inert-Gas-Shielded Weldings," AEC Research and Development Report, HW–64252, May 23, 1960, p. 60.

JOSEPH V. TRUHE, Primary Examiner